(12) United States Patent
Li

(10) Patent No.: US 7,798,028 B2
(45) Date of Patent: Sep. 21, 2010

(54) TRANSMISSION SYSTEM

(76) Inventor: Xiang Yang Li, 9219 Renwood Dr., Houston, TX (US) 77080

( * ) Notice: Subject to any disclaimer, the term of this patent is extended or adjusted under 35 U.S.C. 154(b) by 1181 days.

(21) Appl. No.: 11/380,909

(22) Filed: Apr. 28, 2006

(65) Prior Publication Data

US 2007/0295121 A1    Dec. 27, 2007

(51) Int. Cl.
*F16H 21/22* (2006.01)
(52) U.S. Cl. .................. 74/44; 74/52; 475/162
(58) Field of Classification Search ............... 74/43, 74/44, 52, 68, 69; 475/162, 167
See application file for complete search history.

(56) References Cited

U.S. PATENT DOCUMENTS

| | | | | |
|---|---|---|---|---|
| 2,599,575 A * | 6/1952 | Morgan | ...................... | 464/179 |
| 3,290,950 A * | 12/1966 | Carlson | ........................ | 74/52 |
| 4,152,955 A * | 5/1979 | McWhorter | .................. | 74/602 |
| 4,179,942 A * | 12/1979 | Matthews | ...................... | 74/43 |
| 4,336,723 A * | 6/1982 | Barcita | ........................... | 74/44 |
| 4,509,378 A * | 4/1985 | Brown | ........................... | 74/44 |
| 5,016,493 A * | 5/1991 | Han | ........................... | 74/840 |
| 5,465,648 A * | 11/1995 | Cy | .............................. | 92/140 |
| 6,006,619 A * | 12/1999 | Gindentuller et al. | .......... | 74/44 |
| 6,240,794 B1 * | 6/2001 | Simon | ........................... | 74/52 |
| 6,564,762 B2 * | 5/2003 | Dow | ....................... | 123/78 F |
| 2007/0191171 A1 * | 8/2007 | Pascoe et al. | ............... | 475/230 |

* cited by examiner

*Primary Examiner*—Richard W Ridley
*Assistant Examiner*—Matthew A Johnson
(74) *Attorney, Agent, or Firm*—Theodore Lapus

(57) ABSTRACT

A transmission system made of gears and bearings. The system improves the efficiency of force transfer between rotational motion and rectilinear motion. To accomplish this, the gears and bearings are assembled to allow maximum torque output during force input and reproduced cyclically. Bearings of the transmission system allow a crank to rotate to a position to increase the torque applied on gears to output shaft.

15 Claims, 9 Drawing Sheets ary axis 14. The principle axis 14 then rotates toward R
direction to accomplish the rotational motion.

TRANSMISSION SYSTEM

FIELD OF THE INVENTION

The present invention relates to a transmission system, and more particularly to a force transformation technique for use in a force transformation between the rotational motion and the rectilinear motion.

BACKGROUND OF THE INVENTION

Referring to FIG. 1A, a schematic diagram illustrates a conventional gasoline engine performing a force transformation. The gasoline engine transforms a force of the rectilinear motion into a force of the rotational motion. The force transformation can be achieved through a piston 11 within a cylinder 10, a connector pin 12, a connecting rod 15, a crank shift 16 and a crank pin 13.

An explosive force ignited by gasoline in a combustion chamber of the cylinder 10 drives the piston 11 within cylinder 10 to perform the rectilinear motion as D direction. The rectilinear motion then goes through the crank shaft 16 from the connecting rod 15. The force then transmitted to a principal axis 14. The principle axis 14 then rotates toward R direction to accomplish the rotational motion.

However, the current force transformation technique is poor in the efficiency. The inventor of the present invention based on years of experience on related research and development of the transmission technique invents a transmission system for use in the force transformation.

SUMMARY OF THE INVENTION

Accordingly, the object of the present invention is to provide a transmission system. Furthermore, the present invention relates to a force transformation technique for use in a force transformation between the rotational motion and the rectilinear motion.

In accordance with the present invention the transmission system comprises a first bearing, a second bearing, a third bearing, a first gear, a second gear, a third gear, a fourth gear and a crank. An end of the first bearing is fixed. Another end of the first bearing is sheathed in a center of the first gear based on an axis of the first bearing corresponding to a center of the first gear. An end of the second bearing is sheathed in a section of the first gear which is at a periphery of the first bearing sheathed. A center of the second gear corresponds to an axis of the second bearing, and the center of the second gear relative to the first gear is sheathed in another end of the second bearing. The third bearing is sheathed in a center of the third gear which corresponds to an axis of the third bearing. The third gear also gears into the first gear. The third bearing is sheathed in a section which diverges from a center of the fourth gear. The fourth gear also gears into the second gear. An end of the crank is disposed on a second gear and is at a periphery of the second bearing.

Therefore, according to the transmission system a force is inputted by the third bearing or the crank. When the force is inputted by the third bearing, the aforesaid bearings and gears then transmit the force to the crank so as to output the force. Alternately when the force is inputted by the crank, the aforesaid bearings and gears then transmit the force to the third bearing so as to output the force. Furthermore, the crank is connected to connecting rods. The connecting rods then move in a guide way (31) or a guide bush (32). Therefore, the force transformation between the rotational motion and the rectilinear motion can be achieved. In addition, the number gear teeth for the third gear and the fourth gear at the third bearing of the transmission system can be changed to modify a rotational speed ratio.

Other features and advantages of the present invention and variations thereof will become apparent from the following description, drawings, and claims.

DETAILED DESCRIPTION OF THE PREFERRED EMBODIMENTS

Figure 1A:
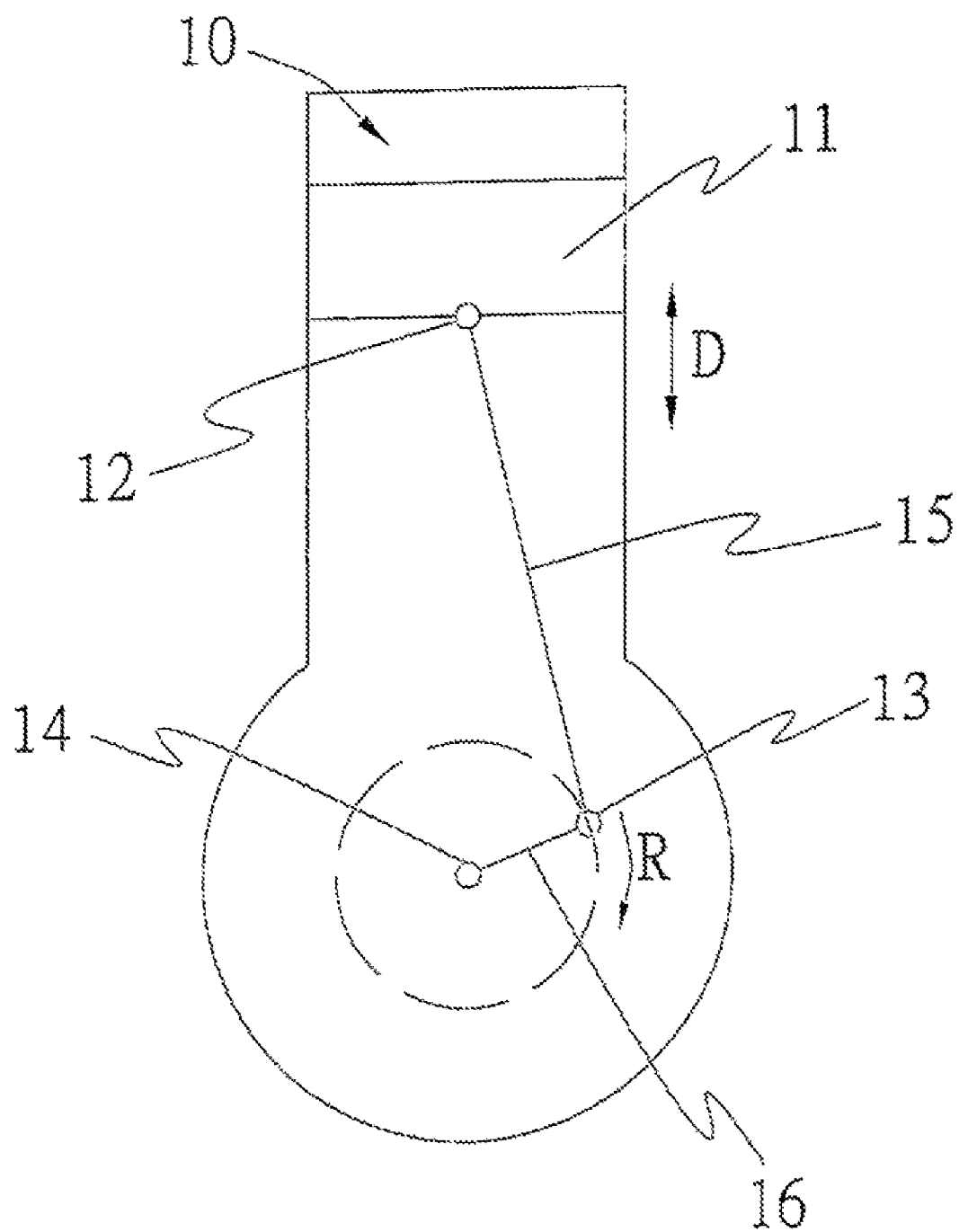
FIG. 1A is a schematic diagram illustrating a conventional gasoline engine to perform a force transformation.
Figure 1B:
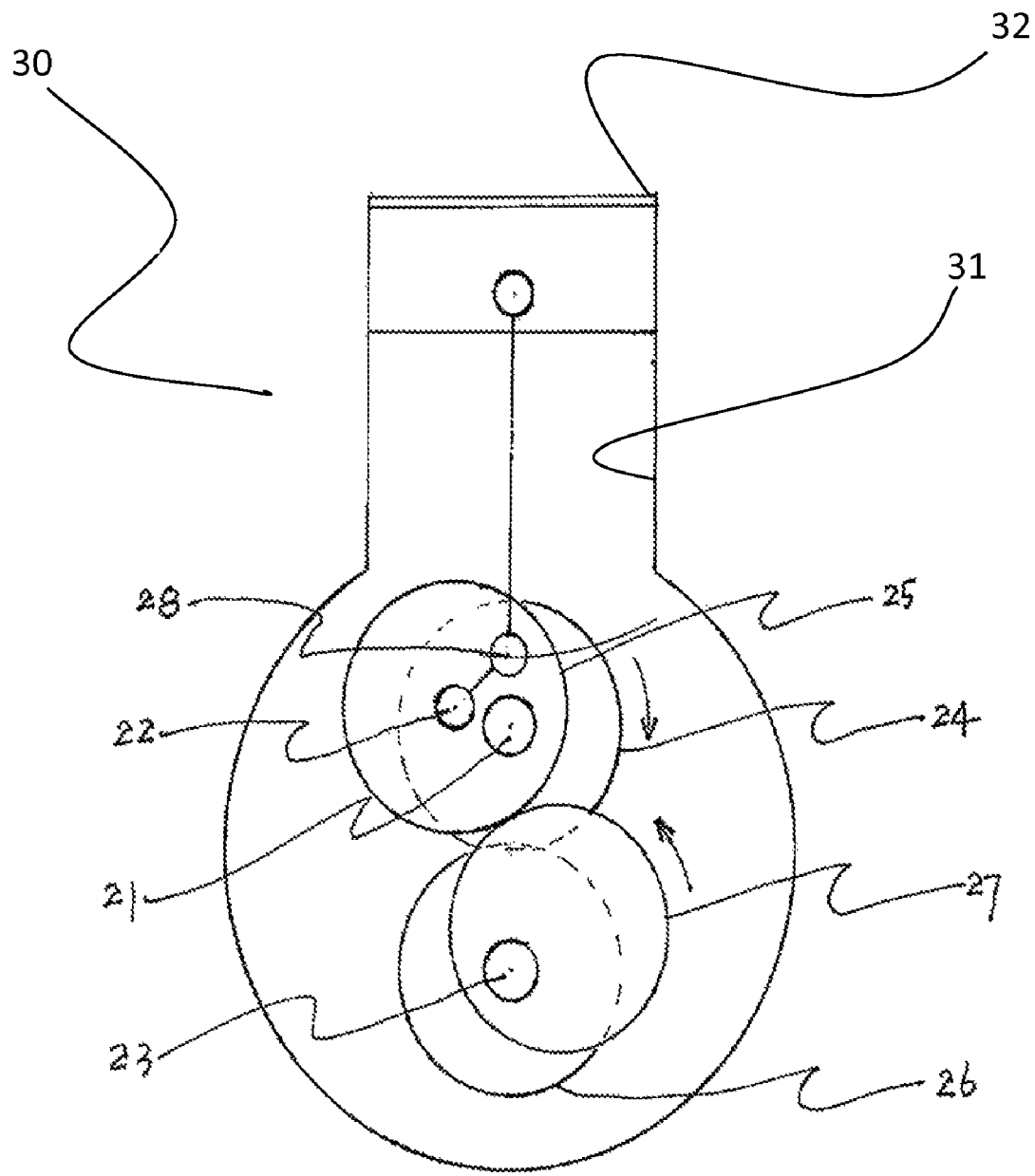
FIG. 1B is a schematic diagram illustrating the transmission system at its upmost position.
Figure 1C:
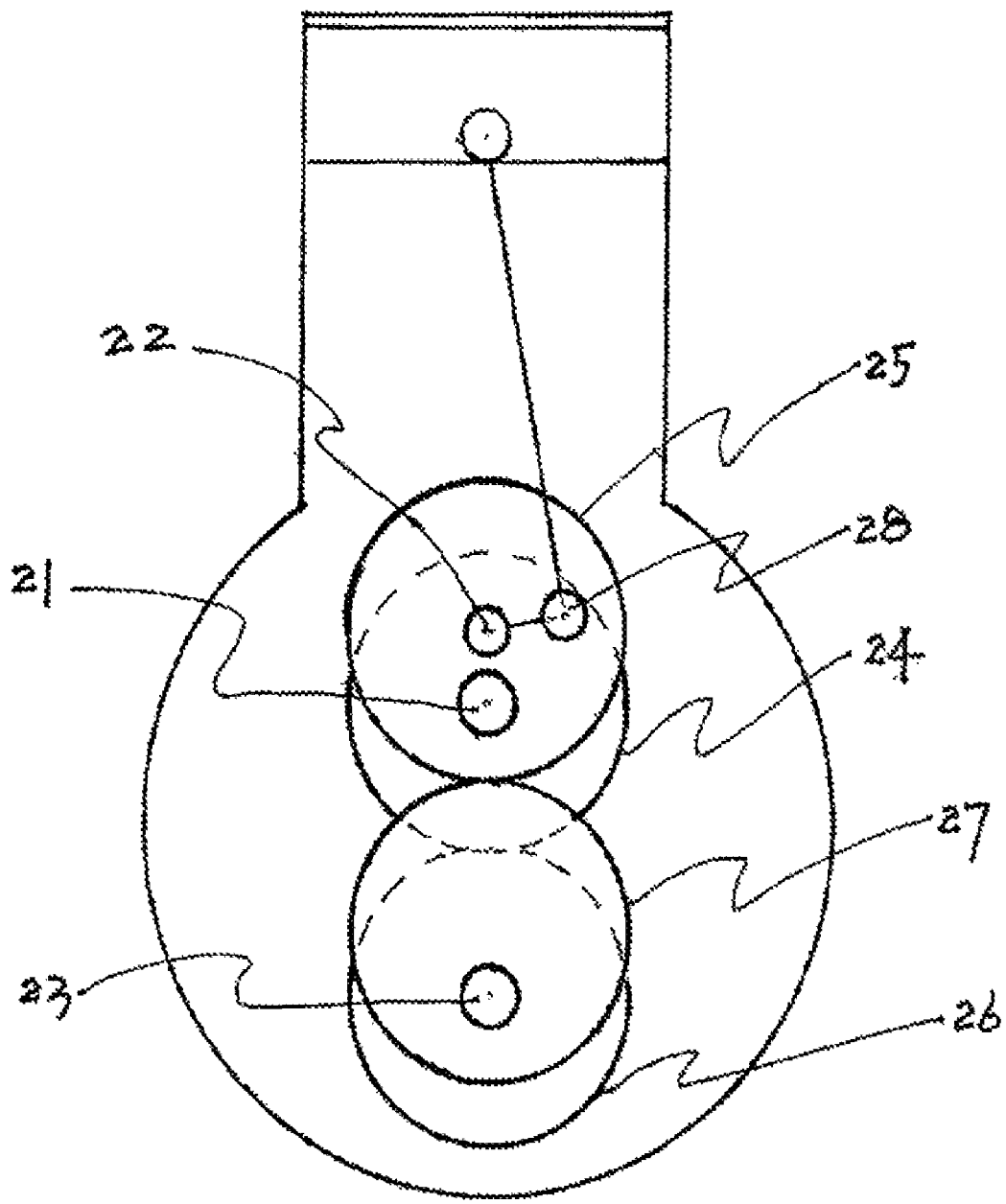
FIG. 1C is a schematic diagram illustrating the crank at optimum position at time of ignition.

To make it easier for our examiner to understand the objective of the invention, its innovative features and performance, a detailed description and technical characteristics of the present invention are described together with the drawing as follows.

Figure 2:
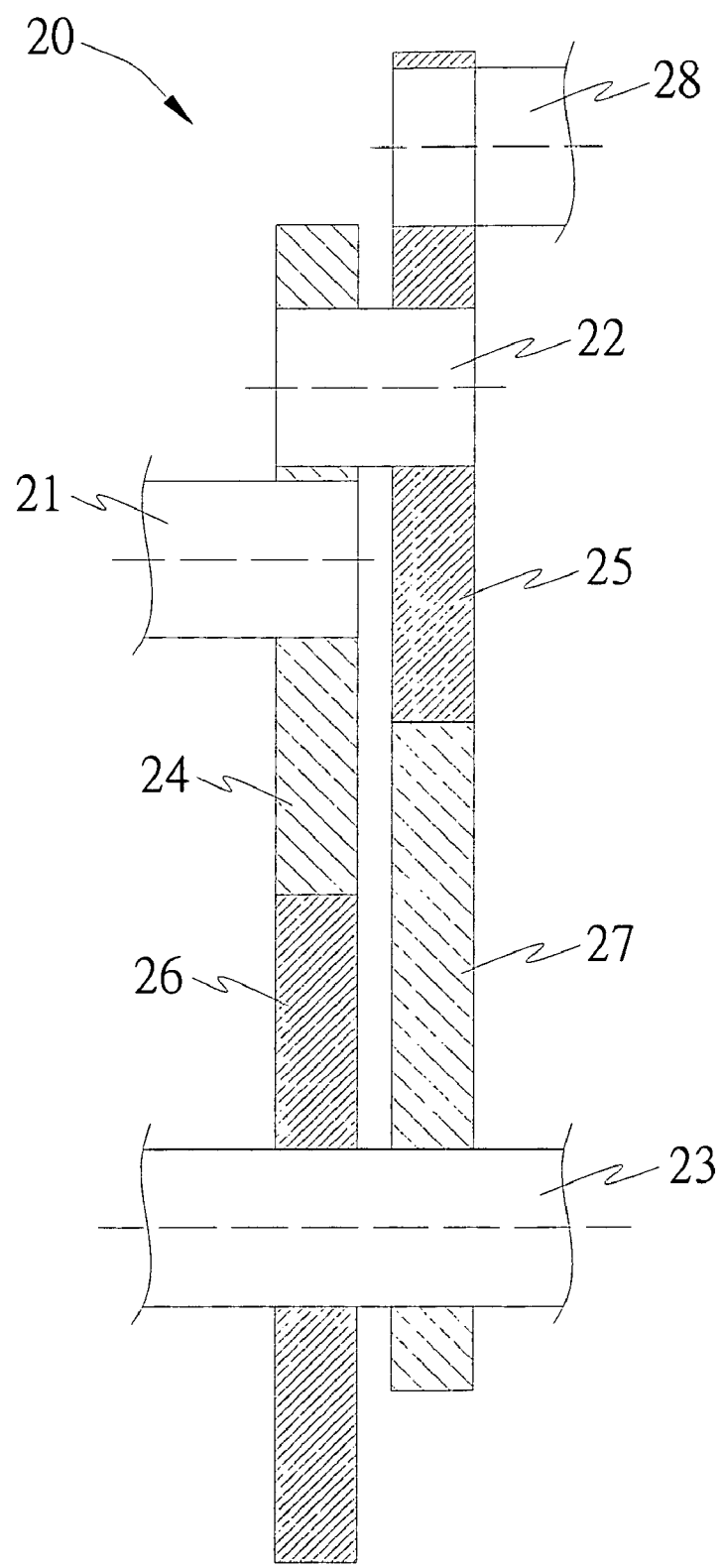
FIG. 2 is a sectional drawing illustrating a transmission system according to an embodiment of the present invention.

Referring to FIG. 2, a sectional drawing illustrates a transmission system according to an embodiment of the present invention. The transmission system 20 includes a first bearing 21, a second bearing 22, a third bearing 23, a first gear 24, a second gear 25, a third gear 26, a fourth gear 27 and a crank 28. An end of the first bearing 21 is fixed. Another end of the first bearing 21 is sheathed in a center of the first gear 24 based on an axis of the first bearing 21 corresponding to a center of the first gear 24. An end of the second bearing 22 is sheathed in a section of the first gear 24 which is at a periphery of the first bearing 21 sheathed. A center of the second gear 25 corresponds to an axis of the second bearing 22, and the center of the second gear 25 relative to the first gear 24 is sheathed in another end of the second bearing 22. The third bearing 23 is sheathed in a center of the third gear 26 which corresponds to an axis of the third bearing 23. The third gear 26 also gears into the first gear 24. The third bearing 23 is sheathed in a section which diverges from a center of the fourth gear 27. The fourth gear 27 also gears into the second gear 25. An end of the crank 28 is disposed on a second gear 25 and is at a periphery of the second bearing 22.

When a force is inputted by the third bearing 23, the aforesaid bearings and gears then transmit the force to the crank 28 so as to output the force. Alternately when a force is inputted by the crank 28, the aforesaid bearings and gears then transmit the force to the third bearing 23 so as to output the force.

Figure 3:
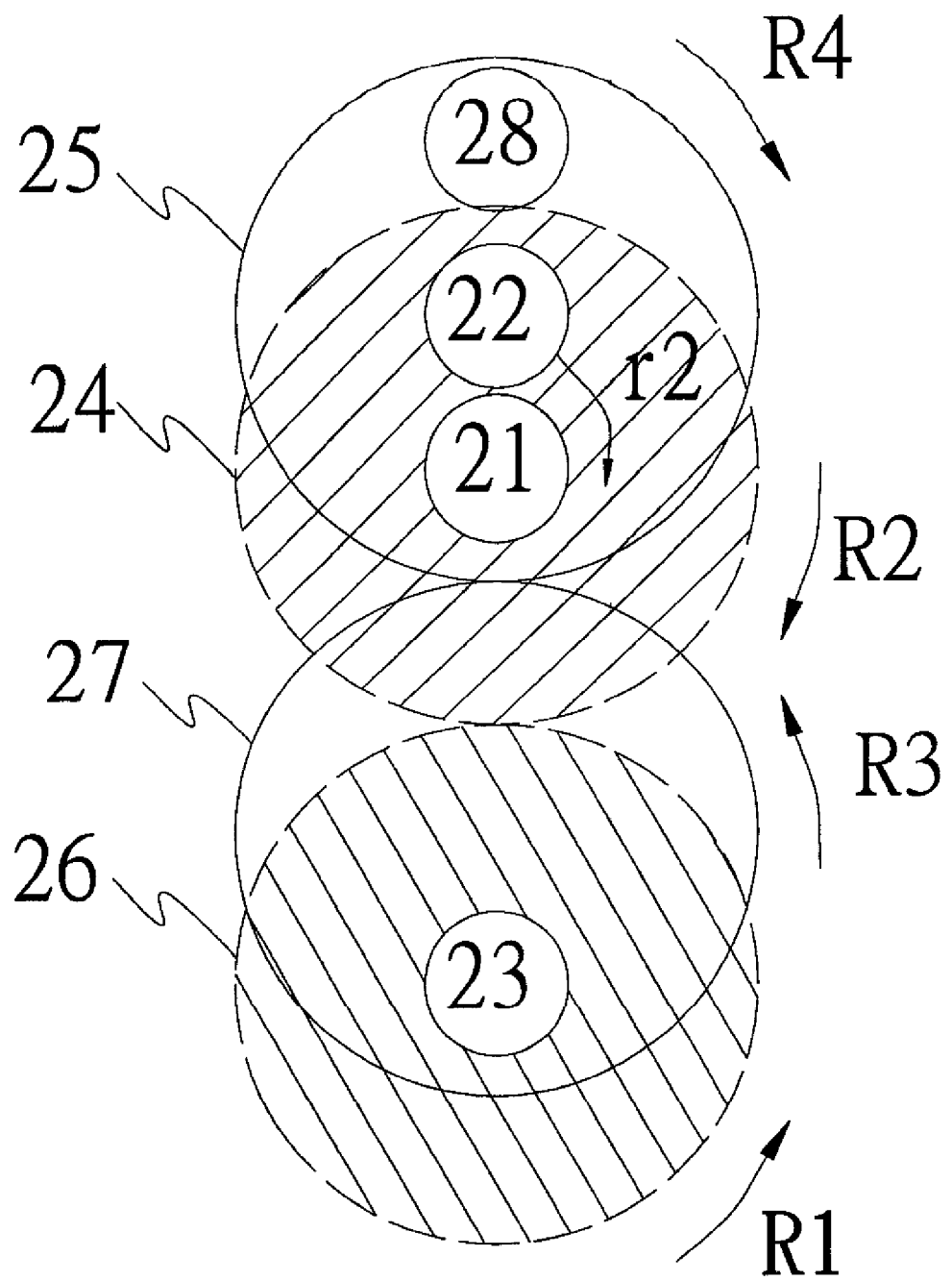
FIG. 3 is a schematic diagram illustrating the transmission system to perform a force transformation.

Referring to FIG. 3, a schematic diagram illustrates the transmission system performing a force transformation according to an embodiment of the present invention. When a rotational force is inputted by the third bearing 23, the third gear 26 rotates toward R1 direction. The first gear 24 which gears into the third gear 26 is then driven to rotate toward R2 direction. The second gear 25 of the second bearing 22 fixed on the first gear 23 rotates toward r2 direction as the revolution by using the first bearing 21 to be a center. The r2 direction corresponds to the R2 direction. Meanwhile, the rotational force in the third bearing 23 influences the fourth gear 27 to rotate toward R3 direction. The second gear 25 which gears into the fourth gear 27 is then driven to rotate toward R4 direction as the rotation by utilizing the second bearing 22 to be a center. Connecting rods connected to the crank 28 then output the force to perform reciprocations as the rectilinear motion. Alternately, when a force is inputted by the crank 28, the second gear 25 rotates toward the R4 direction as the rotation. The fourth gear 27 which gears into the second gear 25 is then driven to rotate toward the R3 direction. The third bearing 23 then rotates in order to output the force. Meanwhile, the third gear 26 is also driven to rotate toward the R1 direction. The first gear 24 which gears into the third gear 26 then rotates toward the R2 direction. The second gear 25 of the second bearing 22 fixed on the first gear 24 is then driven to rotate toward the r2 direction by using the first bearing 21 to be the center. In addition, the second gear 25 is a planetary gear.

Figure 4:
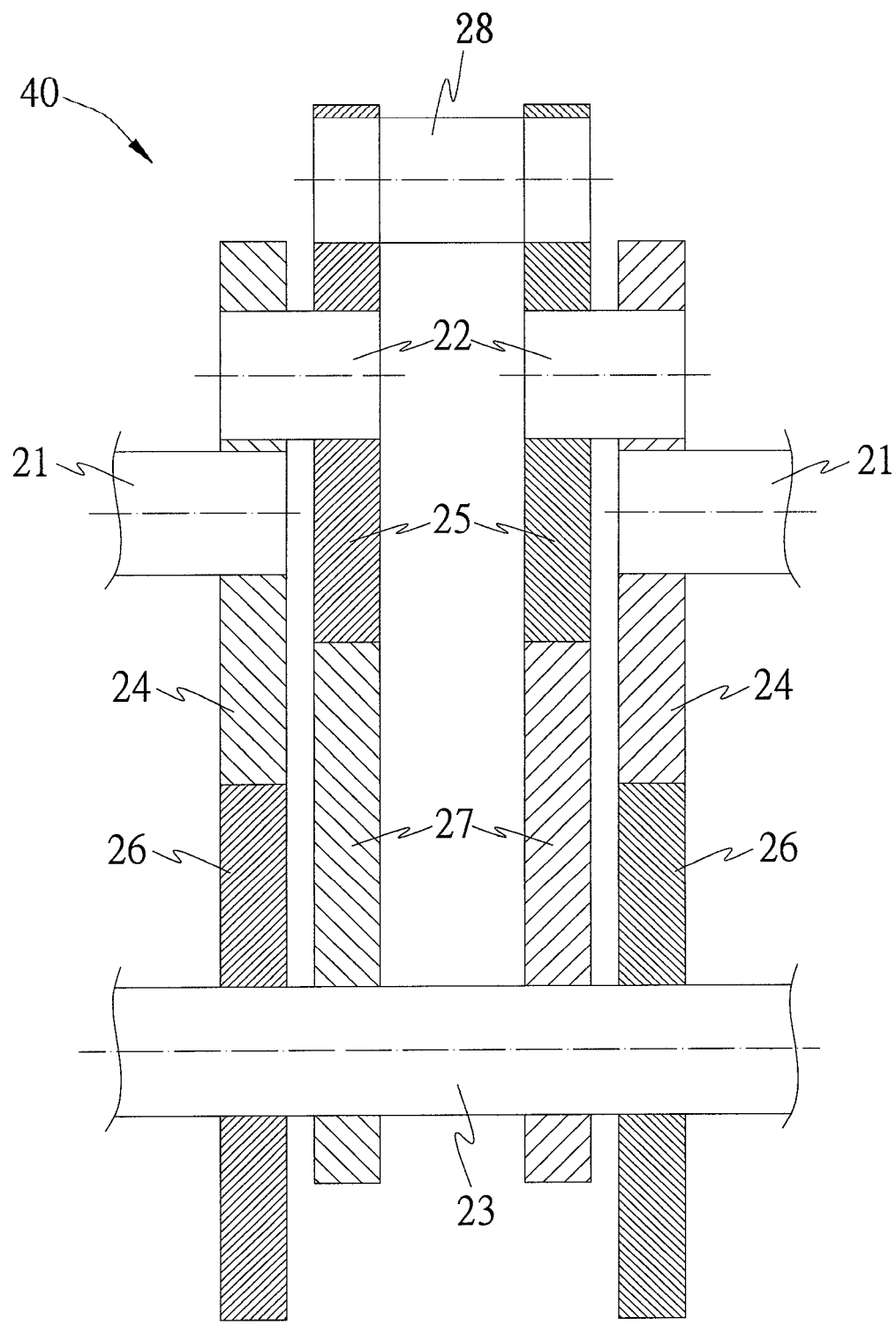
FIG. 4 is a sectional drawing illustrating a second transmission system according to an embodiment of the present invention.

Referring to FIG. 4, a sectional drawing illustrates a second transmission system according to an embodiment of the present invention. The transmission system 40 includes the transmission system 20 as shown in FIG. 2. In other words, the transmission system 40 has two sets of the transmission systems 20 Another end of the crank 28 is connected to another transmission structure set composed of the first bearing 21, the second bearing 22, the third bearing 23, the first gear 24, the second gear 25, third gear 26 and the fourth gear 27. The transmission system 40 then forms a parallel structure.

When a force is inputted by the third bearing 23, the aforesaid gears and bearing then transmit the force to the crank 28 so as to output the force. Alternately when the force is inputted by the crank 28, the aforesaid gears and bearings then transmit the force to the third bearing 23 so as to output the force. In addition, the number gear teeth for the third gear and the fourth gear at the third bearing of the transmission system can be changed to modify a rotational speed ratio. The rotational speed ratio for the third bearing is an integer ratio, a multiple ratio for the first bearing and the second bearing.

Figure 5:
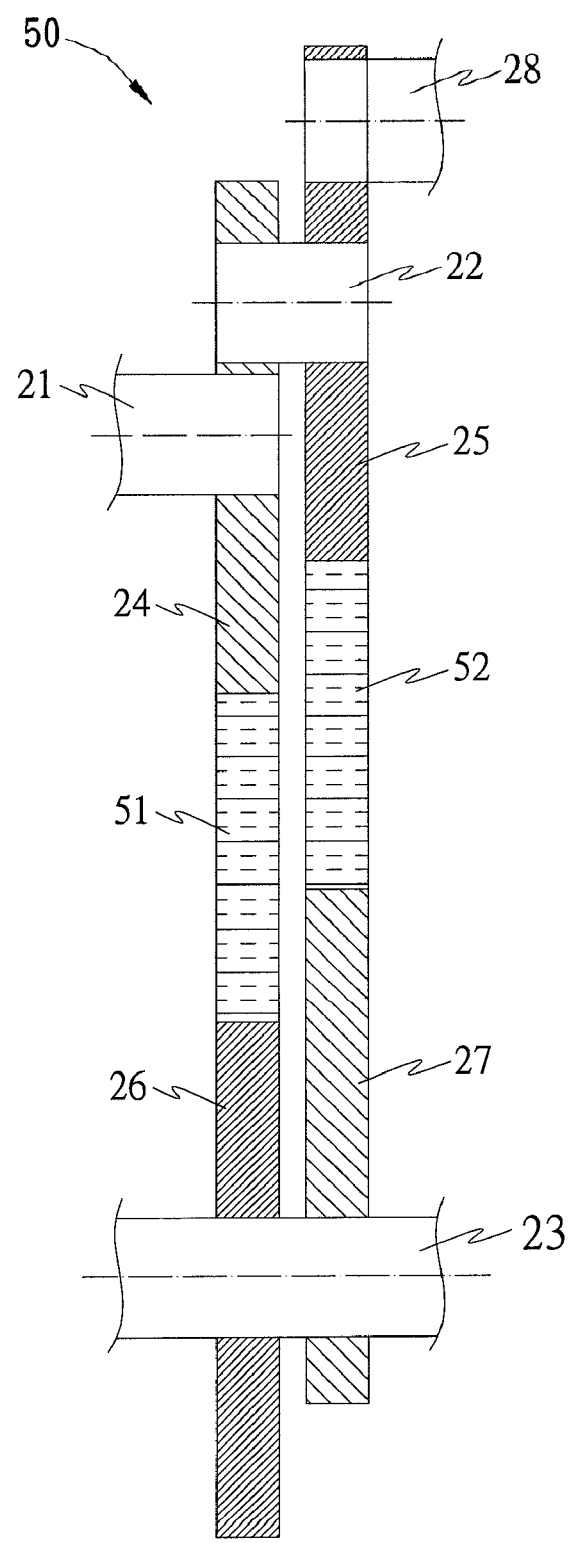
FIG. 5 is a sectional drawing illustrating a third transmission system according to an embodiment of the present invention.

Referring to FIG. 5, a sectional drawing illustrates a third transmission system according to an embodiment of the present invention. The transmission system 50 includes the first bearing 21, the second bearing 22, the third bearing 23, a first belt 51, a second belt 52, the first gear 24, the second gear 25, the third gear 26, the fourth gear 27 and the crank 28. An end of the first bearing 21 is fixed. Another end of the first bearing 21 is sheathed in a center of the first gear 24 based on an axis of the first bearing 21 corresponding to a center of the first gear 24. An end of the second bearing 22 is sheathed in a section of the first gear 24 which is at a periphery of the first bearing 21 sheathed. A center of the second gear 25 corresponds to an axis of the second bearing 22, and the center of the second gear 25 relative to the first gear 24 is sheathed in another end of the second bearing 22. The third bearing 23 is sheathed in a center of the third gear 26 based on an axis of the third bearing 23 corresponding to a center of the third gear 26. The force is then transmitted by the first belt 51, thereby driving the first gear 24. The third bearing 23 is sheathed in a section which diverges from a center of the fourth gear 27. The force is then transmitted by the second belt 52, thereby driving the second gear 25. An end of the crank 28 is disposed on a second gear 25 and is at a periphery of the second bearing 22.

When a force is inputted by the third bearing 23, the aforesaid gears, belts and bearings transmit the force to the crank 28 to output the force. Alternately when the force is inputted by the crank 28, the aforesaid gears, belts and bearings transmit the force to the third bearing 23 to output the force.

Figure 6:
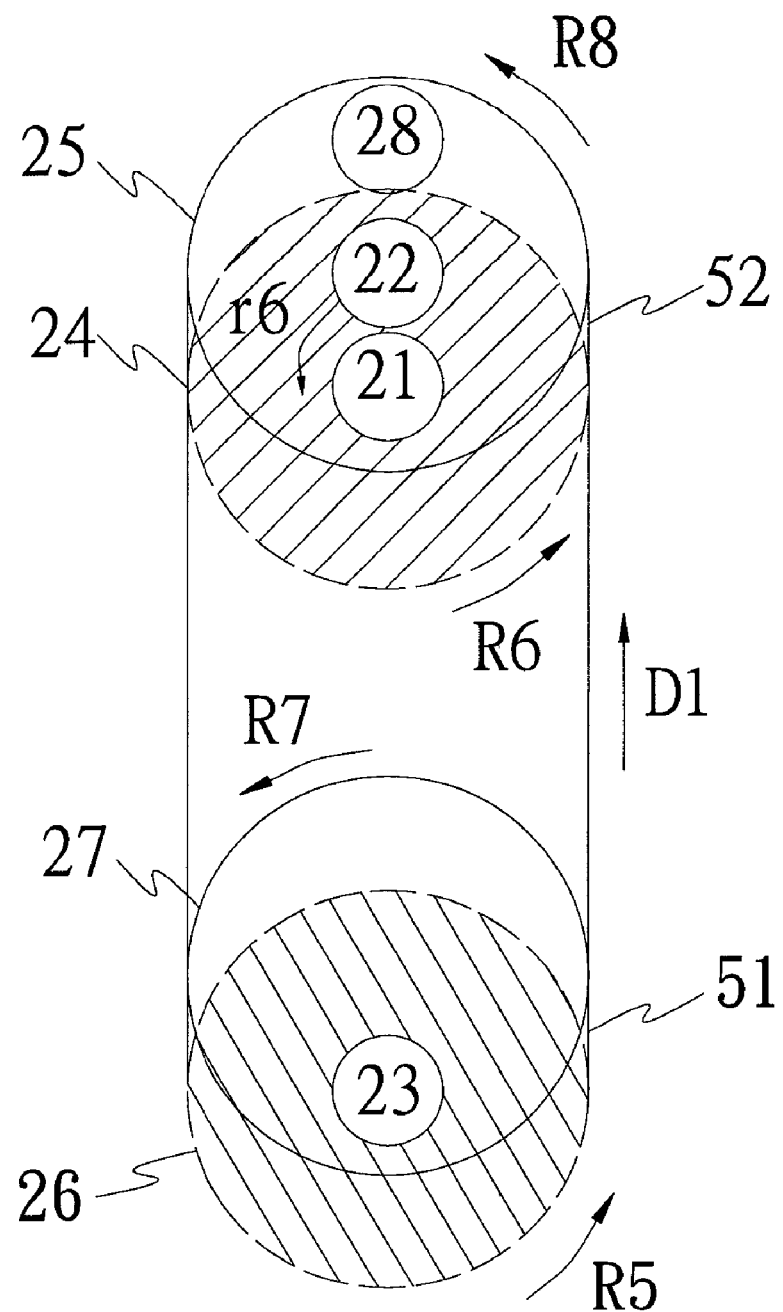
FIG. 6 is a schematic diagram illustrating the third transmission system performing a force transformation according to an embodiment of the present invention.

Referring to FIG. 6 a schematic diagram illustrates the third transmission system performing a force transformation according to an embodiment of the present invention. When a rotational force is inputted by the third bearing 23, the third gear 26 rotates toward R5 direction. The first belt 51 then moves toward D1 direction, which means the first belt 51 transmits the rotational force rotated by the third gear 26. The first gear 24 then rotates toward R6 direction. The second gear 25 of the second bearing 22 fixed on the first ear 23 rotates toward r6 direction as the revolution by using the first bearing 21 to be a center. The r6 direction corresponds to the R6 direction. Meanwhile, the rotational force in the third bearing 23 influences the fourth gear 27 to rotate toward R7 direction. The second belt 52 then moves toward the D1 direction, which means the second belt 52 transmits the rotational force rotated by the fourth gear 27. The second gear 25 then rotates toward R8 direction as the rotation by using the second bearing 22 to be the center. Connecting rods connected to the crank 28 then output the force to perform reciprocations as the rectilinear motion. When a force is inputted by the crank 28, the second gear 25 rotates toward the R8 direction as the rotation. The second belt 52 then moves toward the D1 direction, which means the second belt 52 transmits the force rotated by the second gear 25. The fourth gear 27 then rotates toward the R7 direction. The third bearing 23 then performs a rotational motion output the force. Meanwhile, the third gear 26 is driven to rotate toward the R5 direction. The first belt 51 then moves toward the D1 direction, which means the first belt 51 transmits the force sent from the third gear 26. The first gear 24 then rotates toward the R6 direction. The second gear 25 is also driven to rotate toward the r6 direction as the revolution by using the first bearing 21 to be the center. In addition, the second gear 25 is a planetary gear. Those gears can be replaced to increase the design flexibility.

Figure 7:
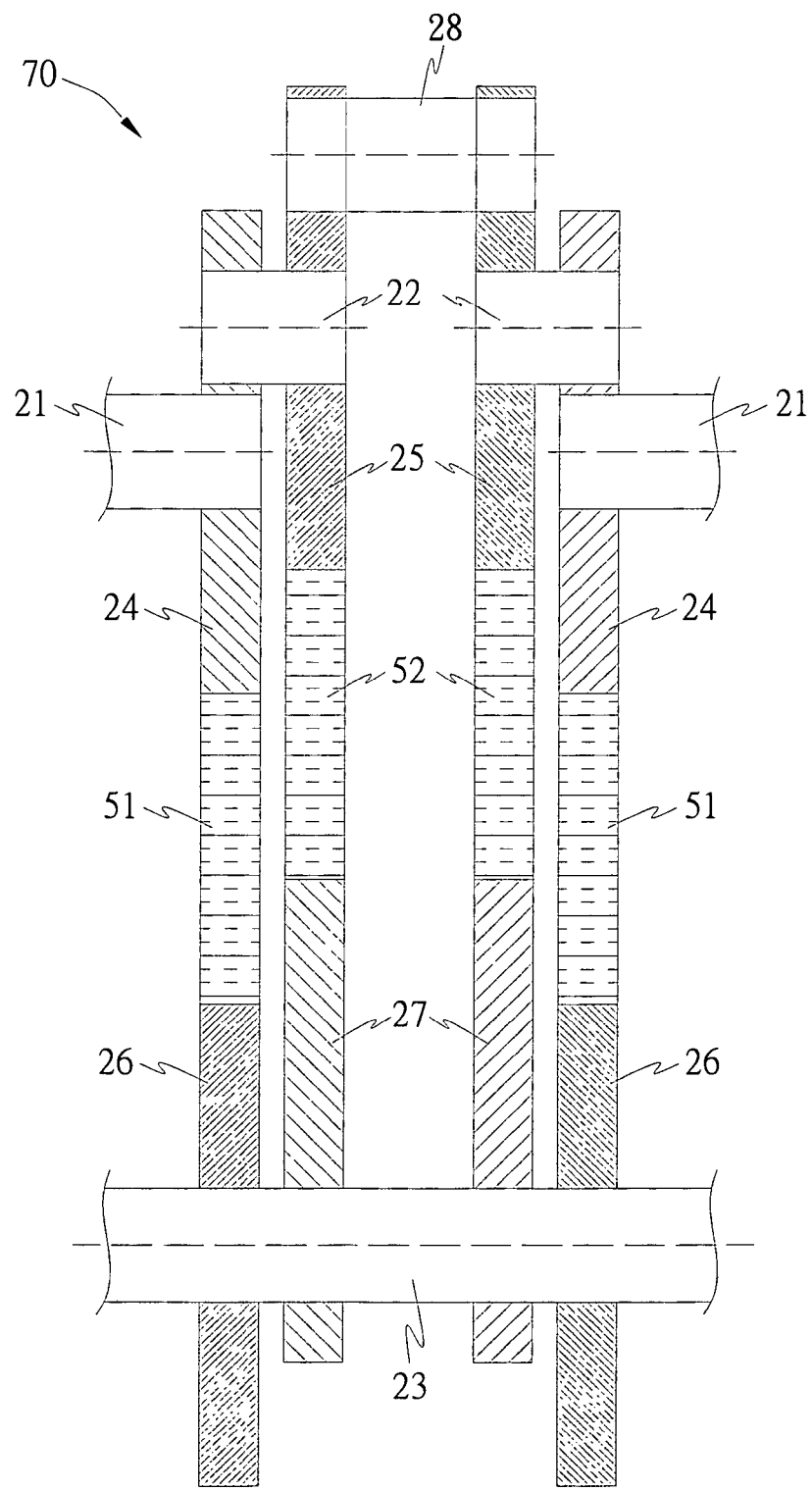
FIG. 7 is a sectional drawing illustrating a fourth transmission system according to an embodiment of the present invention.

Referring to FIG. 7, a sectional drawing illustrates a fourth transmission system according to an embodiment of the present invention. The transmission system 70 includes the transmission system 50 as shown in FIG. 5. In other words, the transmission system 70 has two sets of the transmission systems 50. Another end of the crank 28 is connected to another transmission structure composed of the first bearing 21, the second bearing 22, the third bearing 23, the first belt 51, the second belt 52, the first gear 24, the second gear 25, the third gear 26 and the fourth gear 27. The transmission system 70 then forms a parallel structure.

When a force is inputted by the third bearing 23, the aforesaid gears, belts and bearings transmit the force to the crank 28 to output the force. Alternately when the force is inputted by the crank 28, the aforesaid gears, belts and bearings transmit the force to the third bearing 23 to output the force.

To sum up above, the transmission system illustrated in FIGS. 2, 4, 5 and 6 is generally disposed in a shell (30). The transmission system further includes connecting rods which are connected to the crank to transmit the force. The force transformation between the rotational motion and the rectilinear motion can be achieved when the link motion is in a guide way (31) or a guide bush (32). In addition, the first bearing, the second bearing, the third bearing, the first gear, the second gear, the third gear and the fourth gear are composed of medium carbon steels or materials which could carry loads. The shell (30) is composed of low carbon steels or materials which could carry loads. The gear teeth of gears can be bevel gears, spur gears, or double helical gears. Furthermore, the belts illustrated in FIGS. 5 and 6 can be chains or gear belts. The center distances, the eccentric distances and the torques for the aforesaid gears can be changed based on different demands.

Although the features and advantages of the embodiments according to the preferred invention are disclosed, it is not limited to the embodiments described above, but encompasses any and all modifications and changes within the spirit and scope of the following claims.

What is claimed is:

1. A transmission system, comprising:
    a first bearing, an end of said first bearing being fixed;
    a second bearing;
    a third bearing inputting or outputting a force;
    a first gear, a center of said first gear sheathed on another end of said first bearing, said center of said first gear corresponding to an axis of said first bearing, and an end of said second bearing sheathed on a section of said first gear, and said section of said first gear being at a periphery of said first gear;
    a second gear, a center of said second gear sheathed on another end of said second bearing, said center of said second gear corresponding to an axis of said second bearing;
    a third gear, a center of said third gear sheathed on said third bearing, said center of said third gear corresponding to an axis of said third bearing, and said third gear is directly geared into said first gear;
    a fourth gear, a section of said fourth gear sheathed on said third bearing, said section of said fourth gear diverged from a center of said fourth gear, and said fourth gear is directly geared into said second gear; and
    a crank, an end of said crank disposed on said second gear, and said end of said crank being at a periphery of said second gear for inputting or outputting said force;
    wherein when said third bearing inputs said force, said first bearing, said second bearing, said third bearing, said first gear, said second gear, said third gear and said fourth gear transmit said force to said crank to output said force.

2. The transmission system of claim 1, wherein said transmission system is disposed in a shell.

3. The transmission system of claim 1, wherein said transmission system further comprises a connecting rod and a guide way, and said connecting rod is connected to said crank to transmit said force, and said connecting rod then moves in said guide way.

4. The transmission system of claim 1, wherein said transmission system further includes a connecting rod and a guide bush, and said connecting rod is connected to said crank to transmit said force, and said connecting rod then moves in said guide bush.

5. The transmission system of claim 1, wherein said transmission system further includes another transmission structure set composed of said first bearing, said second bearing, said third bearing, said first gear, said second gear, said third gear and said fourth gear, and said transmission structure set is connected to another end of said crank to form a parallel structure.

6. The transmission system of claim 1, wherein said first bearing, said second bearing, said third bearing, said first gear, said second gear, said third gear and said fourth gear are made by carbon steels or materials.

7. The transmission system of claim 2, wherein said shell is made by carbon steels or materials.

8. A transmission system, comprising:
    a first bearing, an end of said first bearing being fixed;
    a second bearing;
    a third bearing inputting or outputting a force;
    a first belt transmitting said force;
    a second belt transmitting said force;
    a first gear, a center of said first gear on another end of said first bearing, said center of said first gear corresponding to an axis of said first bearing, and an end of said second bearing sheathed in a section of said first gear, and said section of said first gear being at a periphery of said first gear;
    a second gear, a center of said second gear relative to said first gear sheathed on another end of said second bearing, said center of said second gear corresponding to an axis of said second bearing;
    a third gear, a center of said third gear sheathed on said third bearing, said center of said third gear corresponding to an axis of said third bearing, and said third gear being drivingly connected with said first gear and said first belt driving said first gear;
    a fourth gear, a section of said fourth gear sheathed on said third bearing, said section of said fourth gear diverged from a center of said fourth gear, and said second gear being drivingly connected with said fourth gear and said second belt driving said second gear; and
    a crank, an end of said crank disposed on said second gear, and said crank being at a periphery of said second gear for inputting or outputting said force;
    wherein when said third bearing inputs said force, said first bearing, said second bearing, said third bearing, said first belt, said second belt, said first gear, said second gear, said third gear and said fourth gear transmit said force to said crank to output said force.

9. The transmission system of claim 8, wherein said transmission system is disposed in a shell.

10. The transmission system of claim 8, wherein said transmission system further includes a connecting rod and a guide way, and said connecting rod is connected to said crank to transmit said force, and said connecting rod then moves in said guide way.

11. The transmission system of claim 8, wherein said transmission system further comprises a connecting rod and a guide bush, and said connecting rod is connected to said crank to transmit said force, and said connecting rod then moves in said guide bush.

12. The transmission system of claim 8, wherein said transmission system further includes another transmission structure set composed of said first bearing, said second bearing, said third bearing, said first belt, said second belt, said first gear, said second gear, said third gear and said fourth gear, and said transmission structure set is connected to another end of said crank to form a parallel structure.

13. The transmission system of claim 8, wherein said first bearing, said second bearing, said third bearing, said first gear, said second gear, said third gear and said fourth gear are made by carbon steels or materials.

14. The transmission system of claim 9, wherein said shell is made by carbon steels or materials.

15. The transmission system of claim 8, wherein said first belt and said second belt are a chain or a gear belt.

* * * * *